United States Patent Office 2,832,763
Patented Apr. 29, 1958

2,832,763
DIRECT-DYEING CUPRIFEROUS DISAZO-DYESTUFFS

Henri Riat, Arlesheim, Switzerland, assignor to Ciba Limited, Basel, Switzerland, a Swiss firm
No Drawing. Application May 16, 1955
Serial No. 508,817
Claims priority, application Switzerland May 31, 1954
8 Claims. (Cl. 260—148)

The present invention relates to new cupriferous disazo-dyestuffs which, like for example the dyestuff of the formula (1)
HO—H₂C—H₂C—O ... O—CH₂—CH₂—OH
(structure as shown)

correspond to the general formula (2) Y₁ ... Y₂
(structure as shown)

wherein Y₁ and Y₂ each represent a hydroxyl group, at least one of which groups is etherified by an aliphatic radical, advantageously an aliphatic radical containing up to four carbon atoms which may contain, in addition to the carbon and hydrogen atoms only oxygen atoms with single bonds. Thus in the above formula 2Y₁ may represent an alkoxy group advantageously of low molecular weight, which may preferably be further substituted by at least one hydroxyl or alkylated hydroxyl group, and Y₂ represents a group corresponding to the definition of Y₁ or a hydroxyl group.

More particularly the new cupriferous dyestuffs may correspond to the formula (2a)
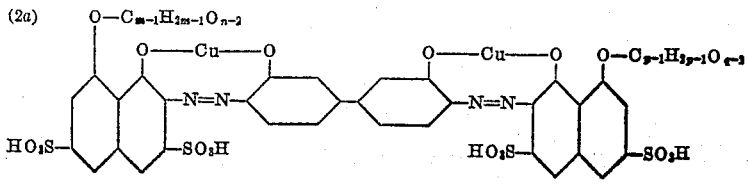

in which $m$, $n$, $p$, and $q$ each represents a whole number, $m$ having a value of at least 2 and at the most 5, $p$ having a value of at least 1 and at the most 5, $n$ and $q$ having a value of at least 2, and wherein the number of the oxygen atoms of each of the radicals —$C_{m-1}H_{2m-1}O_{n-2}$ and —$C_{p-1}H_{2p-1}O_{q-2}$ is at the most that of the carbon atoms in such radical minus one.

Especially valuable dyestuffs are those corresponding to the formula (2b)
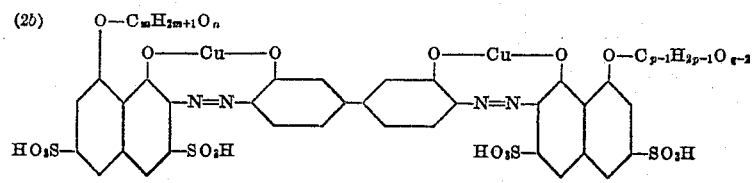

in which $m$, $n$, $p$ and $q$ each represents a whole number, $m$ having a value of at least 2 and at the most 4, $p$ having a value of at least 1 and at the most 5, $q$ having a value of at least 2, and wherein the number of oxygen atoms of each of the radicals —$C_mH_{2m+1}O_n$ and —$C_{p-1}H_{2p-1}O_{q-1}$ is at the most that of the carbon atoms in such radical minus one.

The new cupriferous disazo dyestuffs are obtained by treating a disazo-dyestuff of the formula (3) Y₁ OH H₃CO OCH₃ HO Y₂
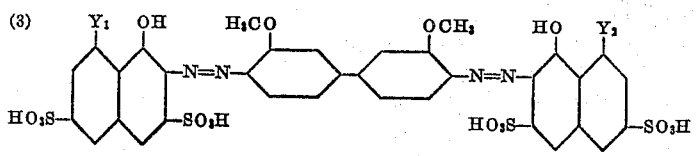

wherein Y₁ represents an alkoxy group advantageously of low molecular weight, which may preferably be further substituted by hydroxyl or alkylated hydroxyl groups, and Y₂ represents an alkoxy group corresponding to the definition of Y₁ or a hydroxyl group, with an agent yielding copper in such a way that the bis-(ortho:ortho'-dioxyazo)-copper complexes are formed with the splitting off of the methoxy groups.

The disazo-dyestuffs of the Formula 3 used as starting materials in the present process can be prepared by coupling a tetrazo-compound of the dianisidine of the formula (4)
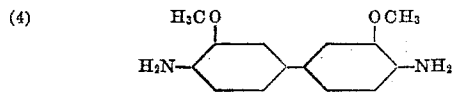

on both sides with an azo-component of the formula (5)
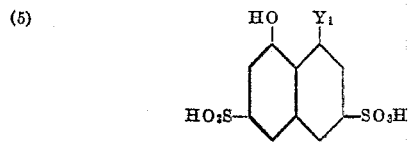

or on one side with such an azo-component and on the other side with an azo-component of the formula (6)
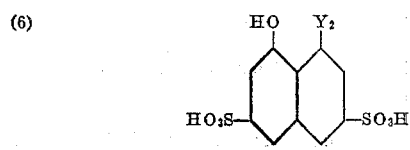

(in the Formulae 5 and 6 $Y_1$ and $Y_2$ having the meanings given above).

The alkoxy group $Y_1$ or $Y_2$ respectively in the azo-components of the Formulae 5 and 6 can be one with a saturated or unsaturated, aliphatic hydrocarbon radical. These alkoxy groups, such as for instance the methoxy-, ethoxy-, n-propyloxy-, isopropyloxy- or allyloxy groups, can be free from further substituents.

Those dyestuffs of the Formula 2 mentioned above are however preferable in which at least one of the alkoxy groups $Y_1$ or $Y_2$ is further substituted by a hydroxyl group which may be alkylated or especially by an HO-group. As a rule, it is of advantage to use azo-components of the Formula 5 with such alkoxy groups whose alkyl radicals, which may be further substituted in the aforementioned manner, only contain few, for example 1 to 4 carbon atoms. Valuable results are obtained for example with azo-components of the kind described whose alkoxy groups are substituted in the alkyl radicals by 1 to 2 hydroxyl groups. Such further substituted alkyl radicals can advantageously be of the formula (7)

wherein $n$ represents either 1 or 2.

By coupling tetrazo-compounds of the kind described with two different azo-components of the Formula 5, asymmetrical dyestuffs are obtained. As can be seen above, the tetrazo-compound can in this case also be coupled on the one side with an azo-component of the Formula 5 and on the other side with 1:8-dihydroxynaphthalene-3:6-disulfonic acid. In the manufacture of asymmetrical dyestuffs it is also especially advantageous if at least one of the azo-components has an alkoxy radical further substituted by a further alkoxy group or advantageously by at least one hydroxyl group.

As examples of suitable azo-components the following compounds may be mentioned:

1-methoxy- or 1-ethoxy-8-hydroxynaphthalene-3:6-disulfonic acid,
1 - β - hydroxyethoxy - 8 - hydroxynaphthalene - 3:6 - disulfonic acid,
1-isopropyloxy- or isobutyloxy - 8 - hydroxynaphthalene-3:6-disulfonic acid,
1-β:γ-dihydroxypropyloxy - 8 - hydroxynaphthalene-3:6-disulfonic acid,
1-β- or -γ-hydroxypropyloxy-8-hydroxynaphthalene-3:6-disulfonic acid,
1-n-propyloxy-8-hydroxynaphthalene-3:6-disulfonic acid,
1-allyloxy-8-hydroxynaphthalene-3:6-disulfonic acid,
1 - β - methoxy-ethoxy - 8 - hydroxynaphthalene-3:6-disulfonic acid.

The azo-components of the Formula 5 can be obtained by known methods, for example by alkylating 1:8-dihydroxynaphthalene - 3:6 - disulfonic acid. The 1-hydroxy-alkoxy-8-hydroxynaphthalene-3:6-disulfonic acids can be for example prepared advantageously by reacting 1:8-dihydroxynaphthalene-3:6-disulfonic acid with hydroxyalkyl halides or alkylene oxides, such as for instance ethylene oxide, preferably in an aqueous medium and in the presence of an acid-binding agent.

The coupling of the tetrazotized 3:3'-dimethoxy-4:4'-diamino-diphenyl with the azo-components of the Formulae 5 and 6 can also be carried out by known methods, advantageously in an alkaline medium, for example in a medium rendered alkaline with alkali carbonate. The couplings can be facilitated by suitable adjuvants, such as alcohol or pyridine.

The treatment with the agents yielding copper can also be carried out by known methods. It should be carried out in such a way that bis-(ortho:ortho'-dihydroxy-azo)-copper complexes are formed. It is advisable to carry out the metallization with complex copper amine compounds, for instance copper tetramine compounds from ammonia, pyridine, alkylamines or more especially hydroxyethylamines.

The cupriferous dyestuffs so obtained correspond to the Formula 2 defined above. This formula as well as the other formulae of cupriferous dyestuffs as presented herein undoubtedly shows the right stoichiometric quantity of copper and the correct position of the copper atom in the complex, whereas the distribution of the principal and secondary valencies in the complex linkage of the copper to the dyestuff is not yet absolutely definite.

The new cupriferous dyestuffs of the Formula 2 are suitable for the dyeing and printing of various materials, especially cellulosic fibers, such as cotton, linen, artificial silk or staple fibers from regenerated cellulose. The dyeings are distinguished by good fastness to light and, as a rule, also by other good fastness properties, such as for example a relatively good fastness to brightening, acid and perspiration. The new dyestuffs are also especially valuable because generally extremely pure, blue tints are obtained, the production of which has up to the present not been possible with the known dyestuffs of the same type. The tints also remain good in artificial light. Viscose artificial silk showing a tendency to dye streakily is dyed uniformly with the new dyestuffs.

The following examples illustrate the invention, the parts and percentages being by weight unless otherwise stated.

*Example 1*

24.4 parts of 3:3'-dimethoxy-4:4'-diaminodiphenyl are tetrazotized in the usual manner, and the tetrazo compound is introduced with ice-cooling into a solution of 74 parts of 1-β-hydroxyethoxy-8-hydroxy-naphthalene-3:6-disulfonic acid rendered alkaline with sodium carbonate. The coupling is accelerated by the addition of pyridine or picoline. When coupling is completed the solution is heated to 70° C. and the disazo-dyestuff is separated off by the addition of sodium chloride and filtered. It dissolves in water with a blue color and dyes cotton blue tints.

For conversion into the copper complex the dyestuff paste is dissolved in 2500 parts of water, and 50 parts of monoethanolamine are added. A solution of 55 parts of crystalline copper sulfate, 80 parts of ammonia of 25% strength and 100 parts of water is then added and the whole is heated under reflux for 24 hours with stirring on a boiling water bath. The copper complex formed is then salted out by adding sodium chloride, filtered off and dried. The dyestuff is a dark powder which dissolves in water with a blue color and dyes cotton clear greenish blue tints.

The 1-β-hydroxyethoxy-8-hydroxynaphthalene-3:6-disulfonic acid used in the example is obtained by reacting ethylene chlorhydrin (about 1.5 mols) with 1:8-dihydroxynaphthalene-3:6-disulfonic acid (1 mol) in an aqueous solution and in the presence of calcium carbonate at boiling temperature.

A dyestuff which also dyes cotton blue tints is obtained when 1-β-hydroxyethoxy-8-hydroxynaphthalene-3:6-disulfonic acid is replaced by 1-ethoxy-8-hydroxynaphthalene-3:6-disulfonic acid.

Further dyestuffs having similar properties to the complex copper compound obtained according to paragraphs 1 and 2 of the present example are obtained by using instead of 1-β-hydroxyethoxy-8-hydroxynaphthalene-3:6-disulfonic acid an equivalent quantity of 1-β- or -γ-hydroxypropyloxy-8-hydroxynaphthalene-3:6-disulfonic acid or 1-β:γ-dihydroxypropyloxy-8-hydroxynaphthalene-3:6-disulfonic acid.

*Example 2*

24.4 parts of 3:3'-dimethoxy-4:4'-diaminodiphenyl are tetrazotized in the usual manner, and the tetrazo-compound is mixed with a solution of 32 parts of 1:8-dihydroxynaphthalene-3:6-disulfonic acid rendered alkaline with sodium carbonate. As soon as no more of the tetrazo-compound can be detected, a solution of 37 parts of 1-β-hydroxyethoxy-8-hydroxynaphthalene-3:6-disulfonic acid and 50 parts of pyridine is added and the whole is stirred until coupling is complete, the coupling mixture being kept alkaline by the addition of sodium carbonate.

The disazo-dyestuff is salted out, filtered and converted into the copper complex according to the method described in Example 1. After working up, a powder is obtained which dissolves in water with a blue color and dyes cotton greenish blue tints.

A similar dyestuff is obtained when 1-β-hydroxyethoxy-8-hydroxynaphthalene-3:6-disulfonic acid is replaced by 1-β-methoxy-ethoxy-8-hydroxynaphthalene-3:6-disulfonic acid or 1-β-hydroxypropyl-8-hydroxynaphthalene-3:6-disulfonic acid.

*Example 3*

100 parts of cotton are entered at 40° C. into a dye-bath containing 0.8 part of the cupriferous dyestuff described in the first and second paragraphs of Example 1 in 3000 parts of water. Dyeing is carried on for half an hour while raising the temperature to 90° C., 30 parts of crystalline sodium sulfate are added and dyeing is continued for another half hour at 90 to 95° C. The cotton is then rinsed and the operation finished in the usual manner. There is obtained a pure greenish blue dyeing which is fast to light.

What is claimed is:

1. A cupriferous disazo dyestuff of the formula

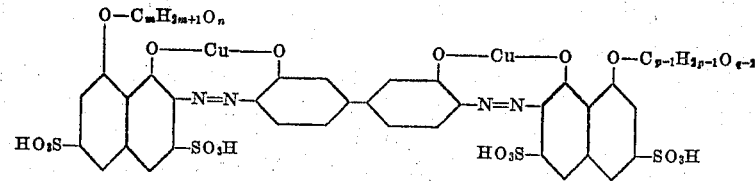

in which $m$, $n$, $p$ and $q$ each represents a whole number, $m$ having a value of at least 2 and at the most 4, $p$ having a value of at least 1 and at the most 5, $q$ having a value of at least 2, and wherein the number of oxygen atoms of each of the radicals $—C_mH_{2m+1}O_n$ and $—C_{p-1}H_{2p-1}O_{q-1}$ is at the most that of the carbon atoms in such radical minus one.

2. A cupiferous disazo dyestuff of the formula

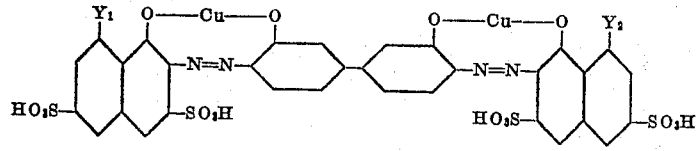

in which $Y_1$ and $Y_2$ each represents a hydroxyalkoxy group containing at the most three carbon atoms.

3. A cupriferous disazo dyestuff of the formula

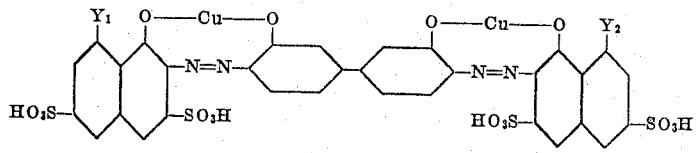

in which $Y_1$ and $Y_2$ each represents a hydroxyalkoxy group containing at the most three carbon atoms and a single hydroxyl group.

4. A cupriferous disazo dyestuff of the formula

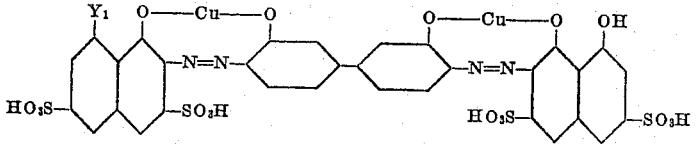

in which $Y_1$ represents a hydroxyl group containing at the most three carbon atoms.

5. A cupriferous disazo dyestuff of the formula

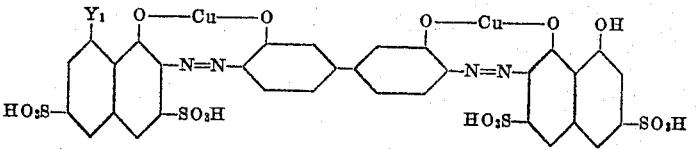

in which $Y_1$ represents a hydroxyalkyl group containing at the most three carbon atoms and a single hydroxyl group.

6. The cupriferous disazo dyestuff of the formula
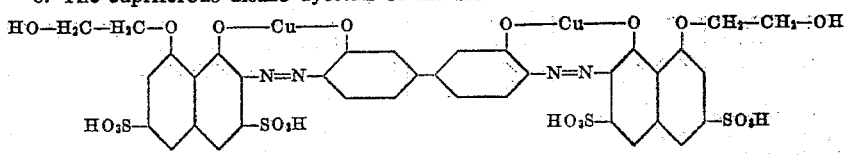
7. The cupriferous disazo-dyestuff of the formula
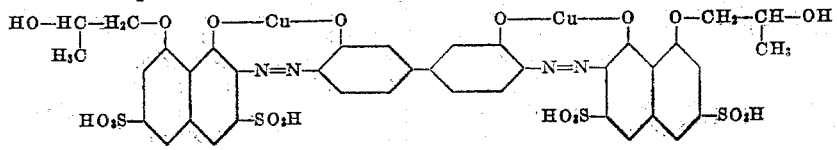
8. The cupriferous disazo-dyestuff of the formula
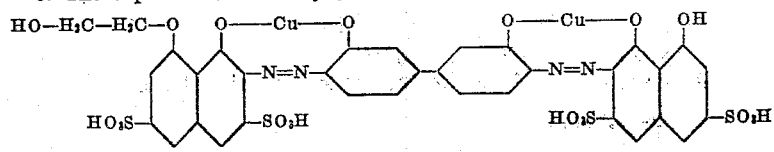
References Cited in the file of this patent
UNITED STATES PATENTS
| | | |
|---|---|---|
| 1,921,337 | Wiedemann et al. | Aug. 8, 1933 |
| 2,476,260 | Mayer et al. | July 12, 1949 |

UNITED STATES PATENT OFFICE

CERTIFICATE OF CORRECTION

Patent No. 2,832,763　　　　　　　　　　　　　　April 29, 1958

Henri Riat

It is hereby certified that error appears in the printed specification of the above numbered patent requiring correction and that the said Letters Patent should read as corrected below.

Column 6, line 63, for "hydroxyl" read -- hydroxyalkyl --.

Signed and sealed this 21st day of October 1958.

(SEAL)
Attest:
KARL H. AXLINE
Attesting Officer

ROBERT C. WATSON
Commissioner of Patents